Aug. 11, 1959  T. A. ST. CLAIR ET AL  2,898,930
PRESSURE REGULATOR
Filed July 5, 1956  2 Sheets-Sheet 1
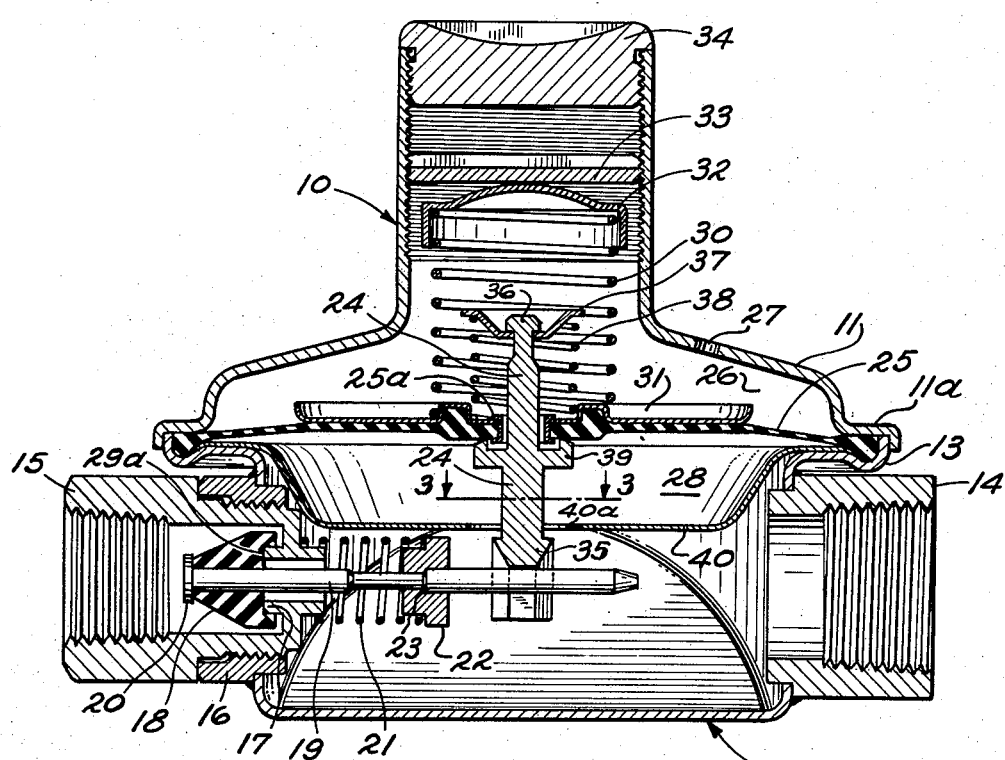
Fig. 1
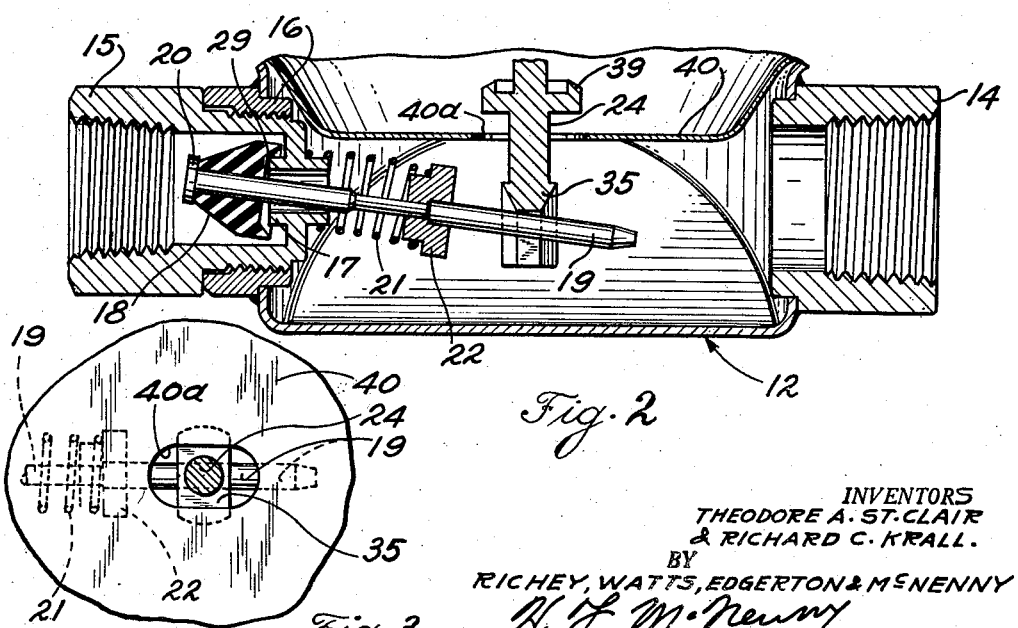
Fig. 2
Fig. 3
INVENTORS
THEODORE A. ST. CLAIR
& RICHARD C. KRALL.
BY
RICHEY, WATTS, EDGERTON & McNENNY
ATTORNEYS

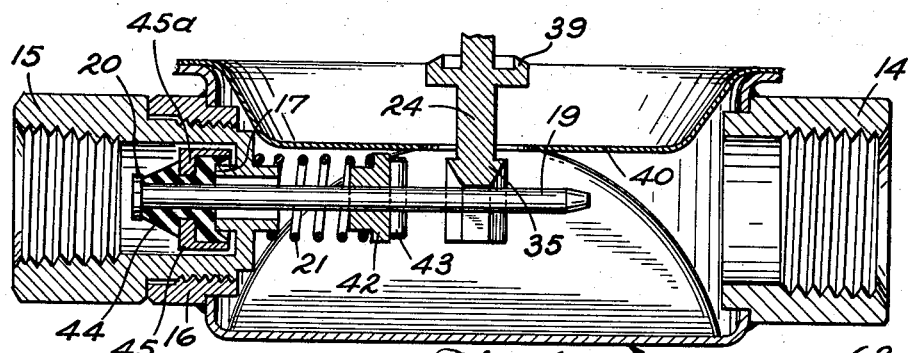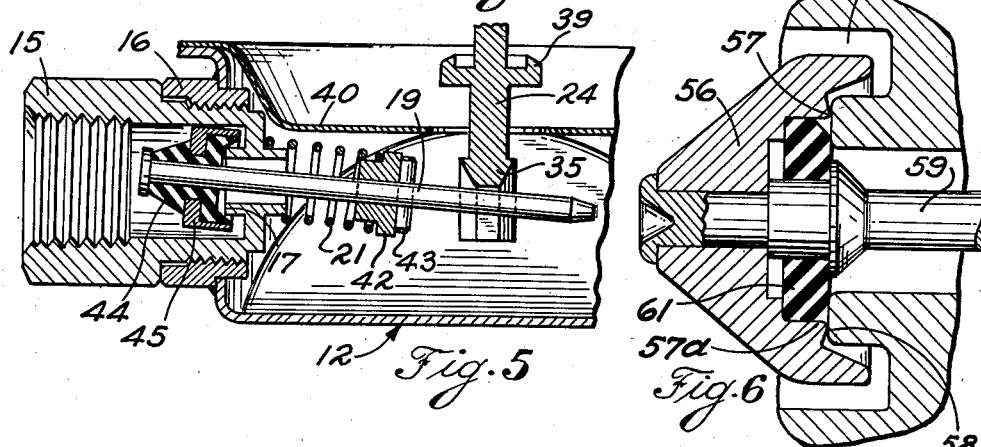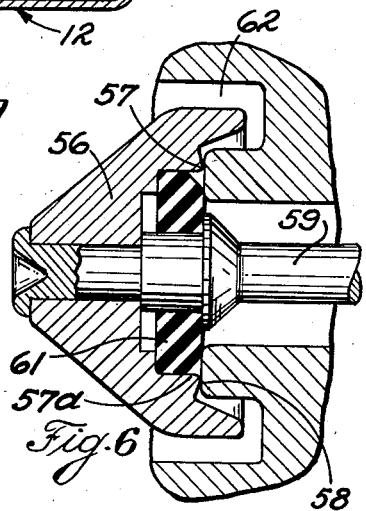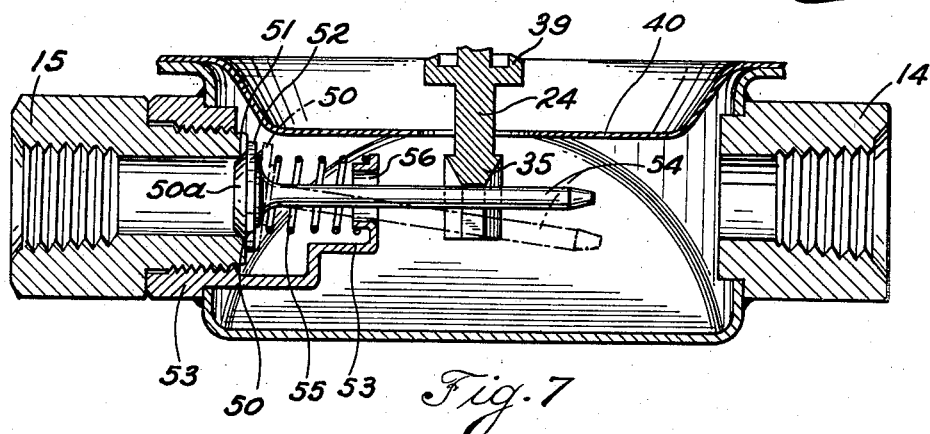

2,898,930

Patented Aug. 11, 1959

2,898,930

PRESSURE REGULATOR

Theodore A. St. Clair, South Euclid, and Richard C. Krall, Willowick, Ohio, assignors to The Weatherhead Company, Cleveland, Ohio, a corporation of Ohio Application July 5, 1956, Serial No. 596,057

2 Claims. (Cl. 137—116.3)

This invention relates to pressure regulators, and particularly to valving means for such regulators.

The preferred embodiment relates to such regulators that are diaphragm controlled and operate through a multiplying lever system.

For example, regulators of the type mentioned are commonly employed in connection with the dispensing of liquefied petroleum gas. Such systems include a supply tank in which the gas is stored under pressure. They also include at least one pressure reducing and regulating device for delivery of gas at the relatively low pressure required by the various service appliances. For example, the pressure of the fluid in the supply tank may be as high as 200 p.s.i., and, as the tank is subjected to varying external temperatures, the pressure might drop to a minimum of approximately 5 or 10 p.s.i. which means that the regulator inlet pressure may vary over a wide range.

The reducing valve of my invention is especially adapted for use with such high pressure cylinders of liquefied petroleum gas to reduce the pressure of the gas to a point suitable for use in gas burners.

In conventional pressure reducing regulators of the high mechanical gain type, close tolerances must be held in all related parts to obtain satisfactory regulating characteristics.

An important feature of my invention is to provide a valving means having high mechanical gain, and yet which virtually eliminates all of the close machining ordinarily necessary.

An object of my invention is to provide a novel, simple and efficient valve and operating mechanism therefor.

A further object of my invention is to provide a regulator which is economical to manufacture by reason of avoiding the need of close machining tolerances.

Another object of my invention is to provide a novel canting valve for pressure regulators.

The manner in which these and other objects and advantages are accomplished will be apparent from the following detailed description of a preferred embodiment of the invention.

In the drawings:

Fig. 1 is a front sectional view of the pressure regulator;

Fig. 2 is a partial sectional view of the regulator of Fig. 1 showing the valve in an open position;

Fig. 3 is a plan view taken at 3—3 of Fig. 1;

Fig. 4 is a partial front sectional of a regulator having another type of valve arrangement;

Fig. 5 is a partial front sectional of the regulator of Fig. 4 showing the valve in open position; and Fig. 6 is a sectional view of another modification of valve and seat arrangement; and Fig. 7 is a partial front sectional view of a pressure regulator having yet another valve arrangement.

Referring now to Fig. 1, a pressure regulator 10 is shown having a cover portion 11 and a body portion 12. The body may be formed by sheet metal stamping, circular in plan and preferably taper bottomed, and is formed with an outwardly extending flange 13 at its upper periphery. Outlet port 14 is fixed in a hole formed in a side wall of the body. The inlet port 15 threadably engages a sleeve member 16. Said sleeve member 16 and outlet port 14 are preferably hydrogen brazed to the body to insure a leak-proof construction.

The valve portion of the regulator of Fig. 1 is composed of an annular valve seat 17 integral with inlet port member 15. A valve member 18 is mounted on a stem member 19 passing through valve seat 17. A flange 20 is provided at one end of stem 19 to prevent longitudinal movement of valve member 18 as the stem 19 is urged toward the valve seat by means of spring 21 coaxial with said annular valve seat 17 acting against a collar 22 secured to stem 19. Said collar 22 is restrained from longitudinal movement along the stem 19 as by shoulder 23.

The stem 19 is canted by the action of plunger 24 when the plunger moves with diaphragm 25. Atmospheric pressure is available in chamber 26 above diaphragm 25 as by vent 27. Chamber 28 below the diaphragm is subjected to outlet pressure, and when the pressure within chamber 28 is reduced, diaphragm 25 moves plunger 24 downwardly against stem 19. The force applied to stem 19 by plunger 24 causes the stem to move downwardly to cant or tilt valve member 18. A portion of the valve member 18 pivots on a portion of the outer periphery of valve seat 17 as shown in Fig. 2.

Such positioning of valve member 18 as set out above allows additional flow through the valve seat 17 to chamber 28 to maintain the desired fluid pressure.

The plunger 24 is actuated by the fluid pressure of the gas acting on the flexible diaphragm 25, which is secured at its periphery between the flange 11a of the cover and flange 13 of the body.

The diaphragm 25 is urged downwardly by a compression spring 30, the lower end of said spring engaging a stiffening plate 31 and the upper end of said spring bears against a retaining cup 32 which bears against slotted adjustable plug 33 threaded into the upper annular opening of cover 11. Adjustment of plug 33 adjusts the tension of the spring 30. A recessed cover plug 34 closes the threaded opening of cover 11.

Movement of the diaphragm 25 is transmitted to stem 19 by plunger 24 which is normally held against the under face of the diaphragm by spring 38. The plunger 24 is formed with a crosshead saddle 35 at the lower end thereof. A plate 40 is provided with an oval aperture 40a, through which plunger 24 and crosshead saddle 35 are inserted. The plunger 24 is then turned 90 degrees so that the upward movement of the diaphragm 25 is limited by crosshead saddle 35 striking plate 40. The relation of crosshead saddle 35 to oval aperture 40a is best shown in Fig. 3.

The plunger 24 is formed with a portion having a reduced cross section and a flange 36 at its upper end to retain split collar 37. The spring 38 acts between collar 37 and stiffening plate 31 to hold flanged portion 39 of plunger 24 in sealing engagement with the underside of diaphragm 25 to prevent flow of gas through aperture 25a provided in diaphragm 25.

If the outlet 14 of the regulator is blocked and leakage occurs through the valve seat 17, the diaphragm 25 will be lifted by the increased pressure. Since the upward movement of plunger 24 is limited by end portion 35 striking against plate 40, the pressure built up under the diaphragm will cause the diaphragm to lift from flange seat 39 of plunger 24, thereby permitting the gas to escape through aperture 25a to chamber 26 and out vent 27.

When the parts are assembled, the crosshead saddle 35 of the plunger 24 is passed through the oval aperture 40a and is then turned 90° to the position shown in Fig.

3. The valve and its stem 19 are separately assembled on the inlet port member 15 which is then screwed into the threaded sleeve member 16 of the body portion 12. When the valve stem 19 is inserted into the regulator, the end of the stem enters between the forks of the crosshead saddle 35 so as to lock the plunger 24 against rotation and thereby prevent the crosshead 35 from again passing upwardly through the aperture 40a. In operation, when the plunger 24 moves downwardly in response to downward movement of the diaphragm 25, the crosshead 35 abuts the upper surface of the stem 19 and cants the valve as shown in Fig. 2. When the plunger 24 moves upwardly the valve is permitted to return to its sealed position shown in Fig. 1 with the stem 19 extending substantially parallel to the diaphragm 25. Further upward movement of the plunger 24 from the position shown in Fig. 1 does not again tilt the valve since the forks of the saddle 35 simply slide past the stem 19. The space between the upper surface of the crosshead 35 and the undersurface of the plate 40 is less than the length of the forks of the crosshead 35 so that the stem 19 cannot escape from the crosshead.

Specifically referring now to valve member 18, it is preferably constructed of synthetic rubber having a durometer of 97—98, and is frusto-conical in shape and is provided with an inclined walled annular recess 29 adapted to contact annular valve seat 17 at its outer periphery. As the valve member 18 is canted by the action of plunger 24 on stem 19, the line of contact at the inner portion of the annular recess 29 may wear or take a set, but the sealing surface 29a—the surface actually making contact at the valve seat—remains unchanged. Thus, the regulator has desirable flow characteristics over an extended period of use.

Additionally, the valve member 18 and seat 17 afford desirable characteristics in regard to the prevention of the freezing of moisture in the opening, since the opening at the valve seat contains gas at low pressure.

A modification of the regulator of Fig. 1 is shown in Fig. 4 insofar as the construction of the valve member 44 is concerned and also in the securement of collar 42 as by pin 43. The valve member 44 is constructed of softer more resilient rubber than valve member 18 of Fig. 1. To provide the desired pivotal action of the valve member 44, the softer material of the valve member is confined both radially and axially. The radial confinement is accomplished by a collar 45 coaxial with the valve member. The axial confinement is obtained by use of flanged end portion 20 of stem 19 and the flanged portion 45a of collar 45.

The canting of valve member 44 in relation to the valve seat 17 is shown in Fig. 5, and is accomplished as was described in conjunction with Fig. 1 and 2.

Fig. 6 discloses another type of valve member that could be utilized in the regulators of Figs. 1 and 4. The valve member 56 is made of metal and a projection 57 contacts the valve seat 58. A stem member 59 is mounted in valve member 56, and when canted as described in conjunction with the stem member of Figs. 2 and 5, the valve member pivots on either projection 57 or 57a in accordance with the cant of stem member 59. Mounted on stem member 59 adjacent shoulder is a resilient soft valve seat seal 61 made of rubber or the like. The valve seat seal 61, with the stem 59 in the position shown, contacts valve seat 58 to close the valve seat to prevent flow of fluid from inlet 62 through valve seat 58. When stem 59 is canted downwardly as viewed in the drawings, the valve seat seal 61 on the stem moves away from valve seat 58 at the lower perimeter thereof, while the valve member is pivoted on projection 57. With the valve seat seal opened in such manner, fluid may pass from chamber 62 through valve seat 58. Thus a valve member and seal are provided which may be canted in the manner described in conjunction with Figs. 2 and 5, with the valve member having a metal to metal contact with the valve seat.

Fig. 7 shows a different metallic canting valve member in a pressure regulator, in that the valve member 50 is downstream from valve seat 51, and a spring retainer collar 52 is integral with inlet sleeve 53. The plunger 24 acted upon by a diaphragm as described in conjunction with Fig. 1 cants stem 54 downwardly with the pivot being at the beveled annular portion 50a of valve member 50.

The valve member 50 is provided with a beveled annular portion 50a for fitting in the complementary annular beveled valve seat 51, and by reason of the beveled portion, the wear at the line of contact of the seat and valve member does not affect the seating of the valve member in the seat.

A spring 55 urges the valve member 50 against the seat 51, but is not strong enough to prevent opening of the valve when the stem 54 is acted upon by plunger 24—the downward position of valve member 50 and stem 54 being shown in dotted lines. The limit of canting of the stem 54 being determined by the extent of aperture 56 in collar 52.

It is to be understood that the specific nature of the present disclosure is not intended to be restrictive or confining and that various rearrangements of parts and modifications of design may be resorted to without departing from the scope or spirit of the invention as herein claimed.

What is claimed is:

1. A regulator comprising a lower body member, said body member having a bottom wall and side walls forming a gas chamber, said lower body member having an inlet port and an outlet port in the side walls thereof, said lower body member having a peripheral circular flange at the top of the side walls thereof, an upper body member having top and side walls forming an atmospheric chamber, said side walls of the upper body member having a peripheral circular flange at the lower edge of the side walls, said upper body member having an opening to atmosphere, a flexible diaphragm mounted at its periphery between the flanges of said upper and lower body members, said diaphragm having a central relief port therein, a diaphragm stem mounted in said relief port, said stem having a reduced diameter shank extending through said relief port and into said atmospheric chamber, said stem having a valve head intermediate the ends of the stem, said valve head extending laterally over said relief port on the gas chamber side thereof and adapted to close the relief port, said stem having a spring around the shank portion thereof in said atmospheric chamber, said spring being operatively connected to the stem and diaphragm to normally bias the valve head on the stem to closed position effecting closure of said relief port in the diaphragm, a transverse plate in the lower body member spaced from the diaphragm and from the bottom wall of the lower body member, said plate having an elongated slot therein coaxial with the relief port in the diaphragm, said slot having its major axis aligned with said inlet port and having its minor axis tranvserse of the inlet port, said stem having a rectangular cross-head at the end thereof remote from its shank, said cross-head having a length exceeding the distance across the minor axis of the slot in said plate, said cross-head having a valve pin slot at right angles to the direction of its length, an inlet valve in said inlet port, said inlet valve having an actuating pin thereon extending from the inlet port and into the valve pin slot in the cross-head to prevent rotation of the diaphragm stem and maintain the cross-head normal to the minor axis of the plate slot to effect opening of the relief port in the diaphragm in response to a predetermined movement of the diaphragm away from said plate.

2. A regulator comprising a lower body member, said body member having a bottom wall and side walls forming a gas chamber, said lower body member having an inlet port and an outlet port in the side walls thereof, said lower body member having a peripheral circular flange at the top of the side walls thereof, an upper body member having top and side walls forming an atmospheric chamber, said side walls of the upper body member having a peripheral circular flange at the lower edge of the side walls, said upper body member having an opening to atmosphere, a flexible diaphragm mounted at its periphery between the flanges of said upper and lower body members, said diaphragm having a central relief port therein, a diaphragm stem mounted in said relief port, said stem having a reduced diameter shank extending through said relief port and into said atmospheric chamber, said stem having a valve head extending laterally over said relief port on the gas chamber side thereof and adapted to close the relief port, a spring around the shank portion of the stem in said atmospheric chamber, said spring being operatively connected to the stem and diaphragm to normally bias the valve head on the stem to closed position effecting closure of said relief port in the diaphragm, a diaphragm spring in said atmospheric chamber to bias the diaphragm toward said gas chamber, a transverse plate mounted on the lower body member extending between the diaphragm and the bottom wall of the lower body member, said plate having an elongated slot therein to receive said diaphragm stem, said slot having its greatest dimension in the direction of said inlet port and having its least dimension transverse of the inlet port, said stem having a cross-head at the end thereof terminating in said gas chamber, said cross-head having a length exceeding the least dimension in the slot in the plate, said cross-head having a valve pin slot at right angles to the direction of the length of the cross-head, an inlet valve in said inlet port, said inlet valve having an actuating pin thereon extending into the gas chamber from the inlet port and proportioned to fit into said valve pin slot in the cross-head to prevent rotation of the diaphragm stem and maintain the cross-head normal to the minor axis of the plate throughout the range of movement of the diaphragm during operation of the regulator.

References Cited in the file of this patent

UNITED STATES PATENTS

| | | |
|---|---|---|
| 2,306,746 | Niesseman | Dec. 29, 1942 |
| 2,436,522 | Meidenbauer | Feb. 24, 1948 |
| 2,445,359 | Meidenbauer | July 20, 1948 |
| 2,543,203 | Roney | Feb. 27, 1951 |
| 2,582,974 | Ey | Jan. 22, 1952 |
| 2,729,236 | Valince | Jan. 3, 1956 |